A. T. SINK.
HEAD STOCK.
APPLICATION FILED APR. 17, 1913.
1,117,920.
Patented Nov. 17, 1914.
3 SHEETS—SHEET 1.
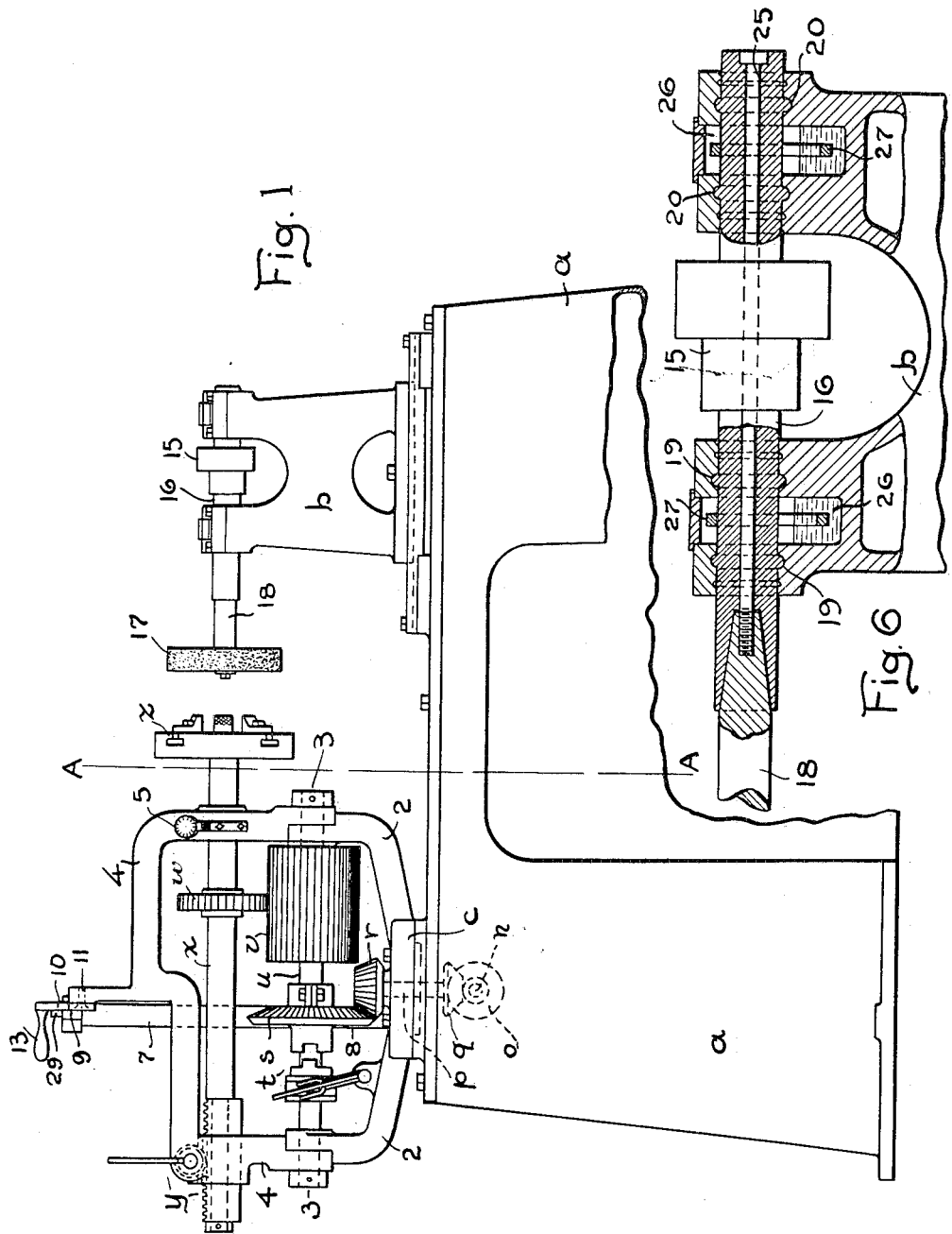
WITNESSES
INVENTOR
Arvel T. Sink
BY
Raymond H. Parker
ATTORNEY

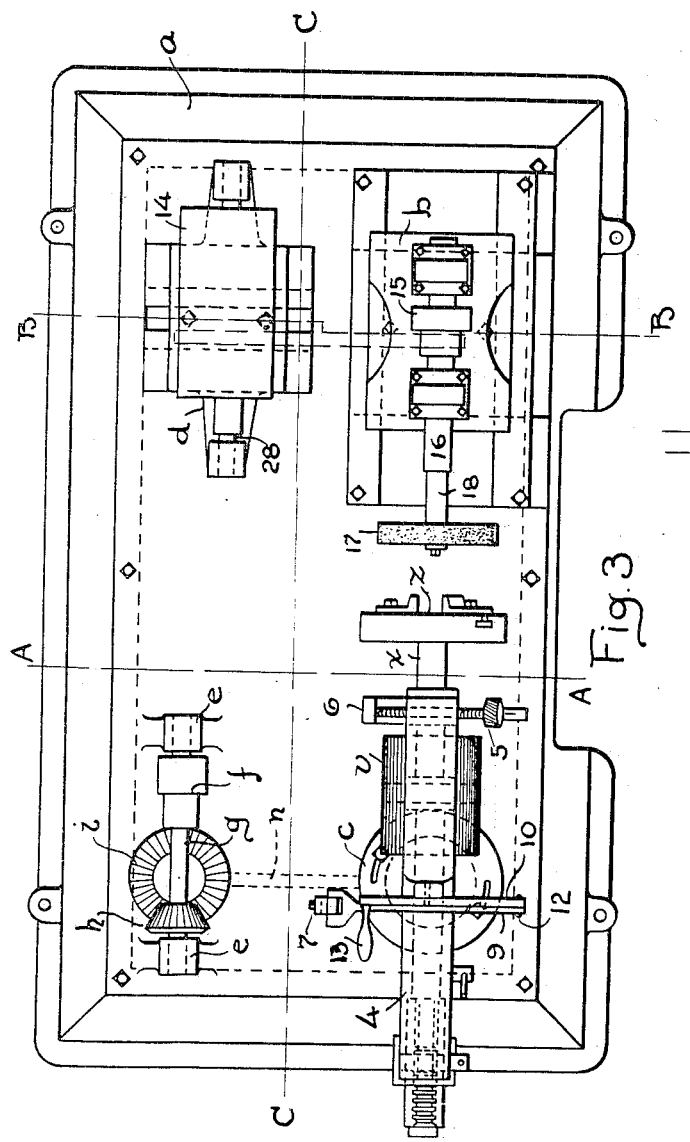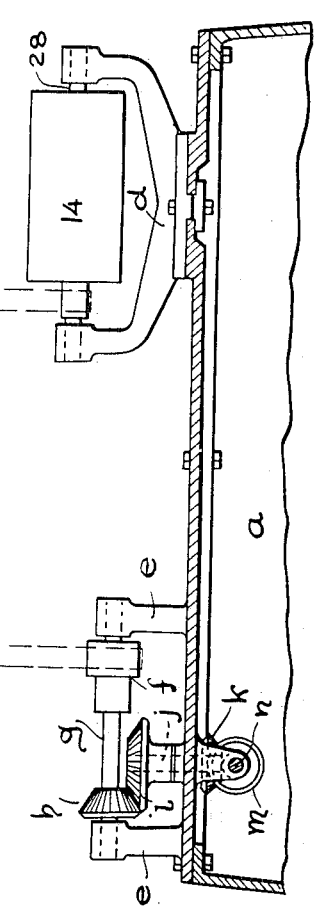

A. T. SINK.
HEAD STOCK.
APPLICATION FILED APR. 17, 1913.
1,117,920.
Patented Nov. 17, 1914.
3 SHEETS—SHEET 3.
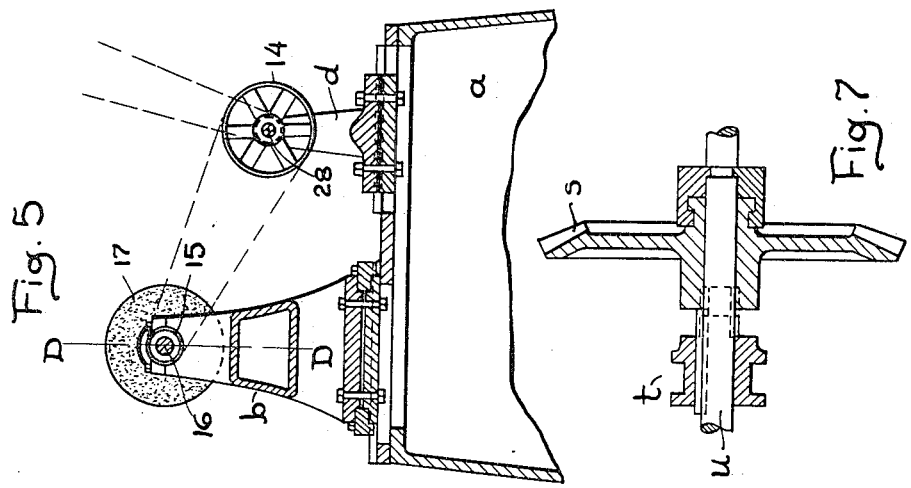
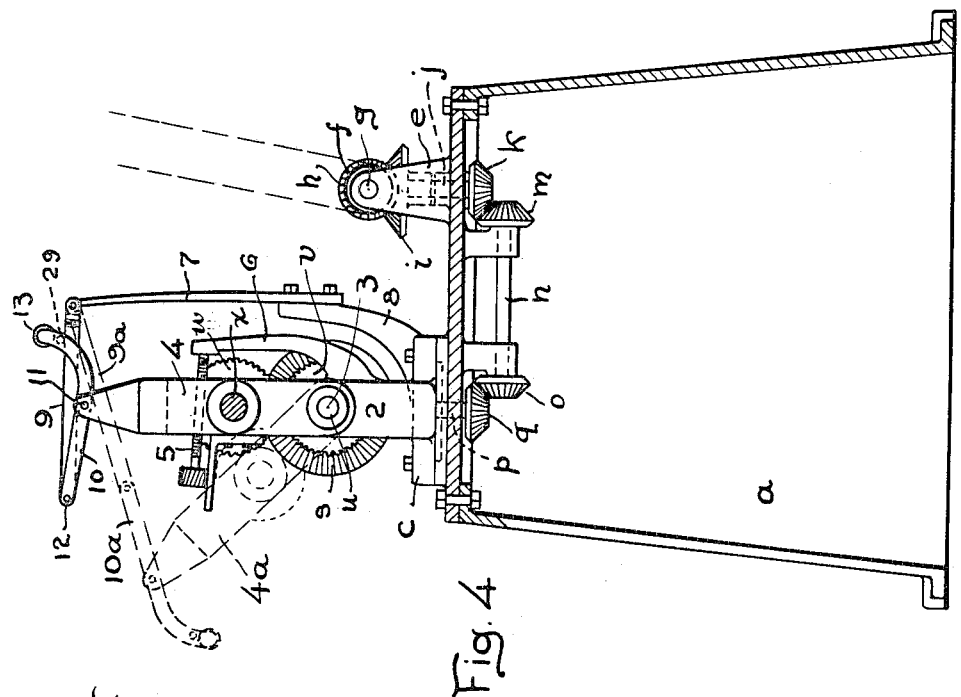
WITNESSES
INVENTOR
Arvel T. Sink
BY
Ralgemund A. Parker
ATTORNEY

UNITED STATES PATENT OFFICE.

ARVEL T. SINK, OF DETROIT, MICHIGAN.

HEAD-STOCK.

1,117,920.

Specification of Letters Patent.　　Patented Nov. 17, 1914.

Application filed April 17, 1913.　Serial No. 761,672.

*To all whom it may concern:*

Be it known that I, ARVEL T. SINK, a citizen of the United States, residing at Detroit, county of Wayne, State of Michigan, have invented a certain new and useful Improvement in Head-Stocks, and declare the following to be a full, clear, and exact description of the same, such as will enable others skilled in the art to which it pertains to make and use the same, reference being had to the accompanying drawings, which form a part of this specification.

My invention relates to grinding machines and consists in the improvements hereinafter described and pointed out in the claims.

In the accompanying drawings: Figure 1, is a side elevation of a machine embodying my invention. Fig. 2, is a section of the upper part of the machine on the line C—C Fig. 3. Fig. 3, is a plan view of the machine. Fig. 4, is a section on the line A—A Figs. 1 and 3 looking from the right of said section line, the chuck $z$ being removed. Fig. 5, is an elevation broken away at its upper part on the plane indicated by the line B—B Fig. 3 looking from the right of said line. Fig. 6, is a detail section on the line D—D Fig. 5. Fig. 7, is a detail view mostly in section showing a clutching arrangement.

$a$ is the base or standard of the machine.

$b$ is a support resting upon the base $a$ toward one end thereof and adapted to slide and to be clamped in various positions. I shall call this support the tail-stock.

$c$ is a support resting upon the base $a$ near the opposite end thereof to that upon which the tail-stock $b$ rests. The support $c$ may be rotated about a vertical axis and be clamped in various angular positions about said axis.

2, 2 are arms integral with the support $c$ and rising therefrom.

4, 4 is a frame work of the general shape of an inverted U, the ends of its arms being pivoted at 3, 3 to the upper ends of the arms 2, 2.

I shall call the support $c$ with its arms 2—2 and the frame work 4 the head-stock.

$d$ is a support having a shaft 28 bearing in its upper part. Said support may be moved upon slides transversely of the base $a$, and clamped in various angular positions.

14, is a pulley on the shaft 28.

$e\ e$ are standards rising from the upper part of the base $a$ toward one end and one side thereof.

$g$ is a shaft bearing in the upper ends of the standards $e\ e$.

$f$ is a step-pulley on the shaft $g$.

$h$ is a bevel gear wheel on the shaft $g$.

$j$, is a shaft extending vertically through the upper part of the base $a$ adapted to rotate in a bearing on said base.

$i$ is a bevel gear wheel upon the upper end of the shaft $j$, its teeth meshing with the bevel gear wheel $h$.

$k$ is a bevel gear wheel on the lower end of the shaft $j$.

$n$ is a shaft below and parallel to the supporting top of the base $a$, resting in bearings in the lower ends of hangers depending from said top.

$m$ is a bevel gear wheel upon the shaft $n$ engaging the bevel gear wheel $k$.

$o$ (Figs. 1 and 4) is a bevel gear wheel on the shaft $n$ toward the opposite end of said shaft to which the bevel gear wheel $m$ is keyed. $p$, is a shaft extending through the top of the base $a$ and adapted to turn in a bearing on said base. $q$, is a bevel gear wheel on the lower end of the shaft $p$, its teeth engaging the teeth of the bevel gear wheel $o$. The shaft $p$ is coaxial with the head-stock and extends through the center of the support $c$. $r$ is a bevel gear wheel on the upper end of the shaft $p$.

$u$ is a shaft adapted to turn in bearings in the upper end of the branches 2—2 which extend from the support $c$. Said shaft rests in bearings coaxial with the pivots of the frame 4 so that said frame may turn about said shaft.

$s$ is a bevel gear wheel upon the shaft $u$, its teeth engaging the teeth of the bevel gear wheel $r$.

$t$ is an adjustable clutch mechanism. The bevel gear wheel $s$ is free to turn about the shaft $u$ except when engaged by the clutch mechanism $t$ in which case it is secured so as to be restrained from angular motion relative to said shaft.

$v$ is a gear wheel of considerable breadth upon the shaft $u$.

$x$ is a shaft, or live spindle, resting in bearings in the frame 4 and provided with a gear wheel $w$ meshing with the gear wheel $v$. The shaft $x$ may move longitudinally through its bearings in the frame 4.

$y$, is a feed mechanism of a conventional form by which the shaft $x$ may be moved longitudinally.

$z$, is a chuck upon the end of the live spindle $x$.

6 is an arm rising from one of the arms or branches 2, 2.

5 is a lateral feed mechanism consisting of a set screw passing through a part of the frame 4, its threads engaging threads in said frame, and its inner end contacting the upper end of the arm 6, (Fig. 4) to adjust the angular position of the frame 4.

8 is an arm rising from the support $c$.

7 is a spring secured to and extending upward from the arm 8.

9, is a bar pivoted to the upper end of the spring 7.

10, is a bar pivoted at one end at 12 to the opposite end of the bar 9 to that which is pivoted to the spring 7. The bar 10 is pivoted between its ends at 11 to an upper portion of the frame 4. The bars 9 and 10 may pass by each other in turning about the pivot 12 but the bar 10 is restrained in such motion in the direction of the hands of a clock, in the position shown in Fig. 4, by a lug 29 extending laterally therefrom which contacts the bar 9. It will be noticed that in the position shown in Fig. 4 the pivot 11 is below the line of action of the spring 7 so that the tendency of the force exerted by said spring through the bar 9 is to press the lug 29 more firmly against the bar 9 so that the parts are fixed in position.

13 is a handle extending laterally from the bar 10.

The frame 4 may be turned about its pivots 3—3 to the position indicated at 4$^a$ Fig. 4. By turning the bar 10 by means of the handle 13 about the pivot 11 in the direction opposite to that of the hands of a clock thus bringing the bars 9 and 10 into the positions 9$^a$ and 10$^a$ indicated in dotted lines in Fig. 4. In this position the work may be easily removed from the chuck.

The position of the work relative to the grinding wheel may be accurately adjusted by means of the set screw of the feed mechanism 5.

15, is a step-pulley on the shaft 16 which shaft rests in bearings in the upper part of the support or tail-stock $b$.

18 is a stub shaft adapted to engage in a socket in a conventional way, which socket is in the end of the shaft 16 (Fig. 6).

17 is a grinding wheel on the end of the stub shaft 18.

19 and 20 (Fig. 6) indicate annular ridges extending from the periphery of the shaft 16 and resting in similarly formed grooves in the bearings in the support $b$ and the caps for said bearings.

26—26 are oil receptacles in the upper part of the support $b$.

27—27 are oil rings upon the shaft 16 for manipulating the stub shaft 18.

The operation of the above described device is as follows: Motion is conveyed to the shaft 16 by a belt from the source of power passing around and driving the pulley 14 from which a belt leads to the step-pulley 15. It will be noticed that the pulley 14 is of considerable length. The support, or tail-stock, $b$ may be moved on its ways to different positions toward and away from the head-stock and a belt may pass between the pulleys 14 and 15 and may be moved laterally. Motion may be conveyed to the live spindle $x$ of the head-stock by a belt from the source of power passing around the step-pulley $f$ and rotating the shaft $g$ which drives the shaft $n$ through the pulleys $h$ $i$ $k$ $m$ and shaft $j$ and the rotation of the shaft $n$ actuates the gear wheel $s$ through the bevel gear wheels $o$ and $p$ the shaft $q$ and the bevel gear wheel $r$.

When the bevel gear wheel $s$ is bound to the shaft $u$ by the clutch mechanism $t$, the gear wheel $v$ is rotated which drives the gear wheel $w$ and shaft $x$. The gear wheel $w$ may move parallel to the axis of the gear wheel $v$ with the live spindle or shaft $x$ in the longitudinal movement of the latter without its teeth being disengaged from the teeth of the gear wheel $v$. The article to be operated upon is placed in the chuck $z$ in the usual way and is adjusted to the required position by moving the head-stock about its vertical axis. The grinding wheel 17 is also adjusted to the proper position to act as required upon said article. By moving the live spindle $x$ longitudinally the different parts of the article to be operated upon may be presented to the grinding wheel 17.

The ridges or annular projections 19 and 20 take up the end thrust that comes upon the shaft 16 and any wear may be compensated for by adjusting the position of the caps of the bearings over said ridges.

The live spindle $x$ may be set in motion or stopped by manipulating the clutch mechanism $t$.

What I claim is:—

1. In a grinding machine, a head-stock having a shaft mounted in bearings therein, a gear wheel on said shaft, a frame pivoted coaxial with said shaft, a spindle in said frame having a gear wheel with its teeth engaging the gear wheel on the first mentioned shaft, and means for holding the work on said spindle.

2. The combination in the head-stock of the pivoted frame 4—4 the spring 7 links 9 and 10, the link 9 being pivoted to said spring and to the link 10, and the link 10 being pivoted to said frame between its ends, the pivot between the link 10 and said frame being below the line of action of the spring 7 and means for limiting the rotation of the link 10 about its pivot to said frame, substantially as and for the purpose described.

3. In a grinding machine, a head-stock having a shaft mounted in bearings therein, a gear wheel on said shaft, a frame pivoted coaxially with said shaft, a spindle in said frame and a gear wheel on said spindle its teeth engaging the gear wheel on said shaft, means for driving said gear wheel, and means for connecting and disconnecting the driving means with said gear wheel on the shaft.

In testimony whereof, I sign this specification in the presence of two witnesses.

ARVEL T. SINK.

Witnesses:
VIRGINIA C. SPRATT,
ELLIOTT J. STODDARD.